UNITED STATES PATENT OFFICE.

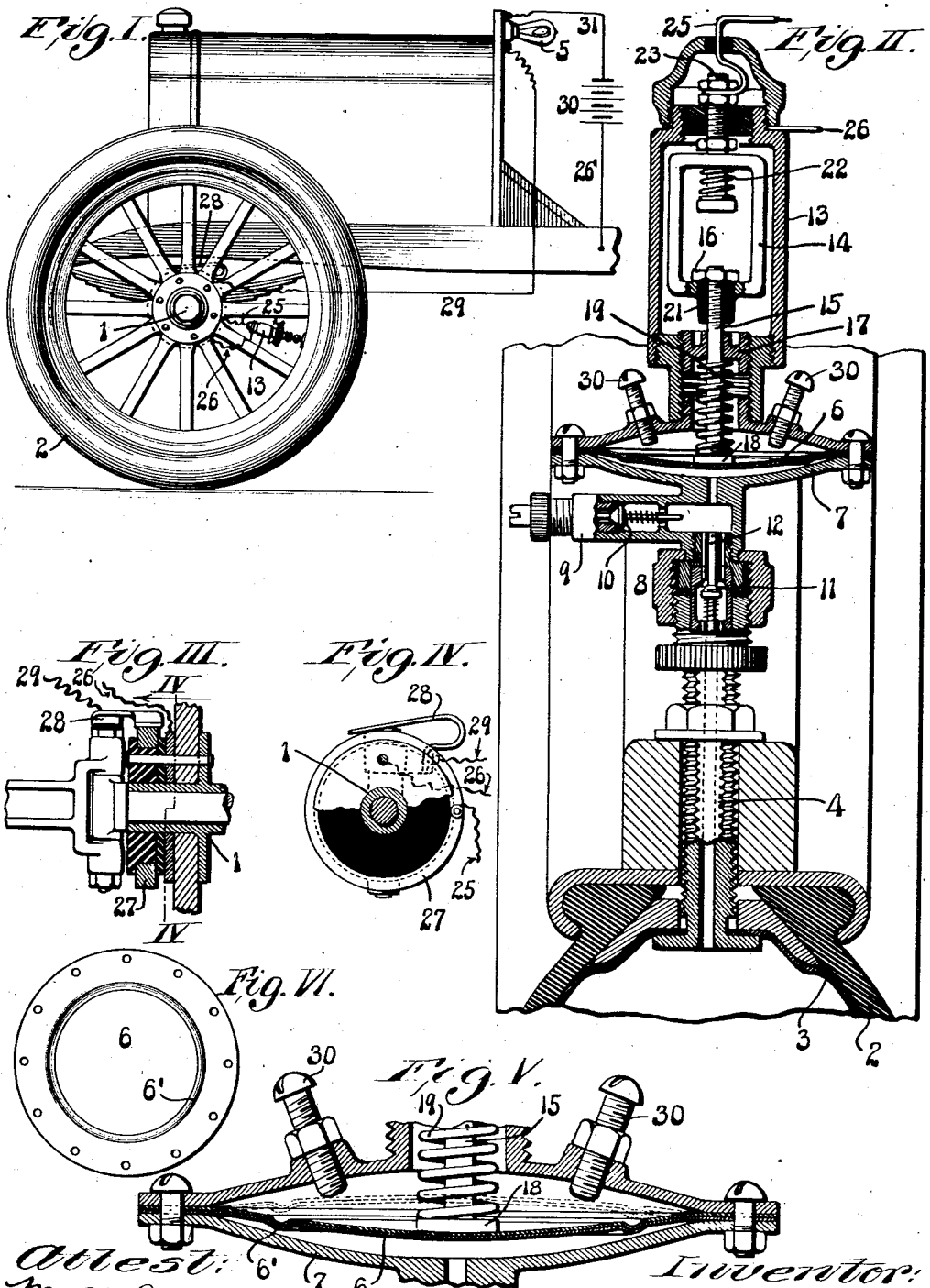

JOHN L. PARDUE, OF ST. LOUIS COUNTY, MISSOURI.

PRESSURE-INDICATING DEVICE.

1,183,486.    Specification of Letters Patent.    Patented May 16, 1916.

Application filed February 8, 1915. Serial No. 6,935.

*To all whom it may concern:*

Be it known that I, JOHN L. PARDUE, a citizen of the United States of America, a resident of the county of St. Louis, State of Missouri, have invented certain new and useful Improvements in Pressure-Indicating Devices, of which the following is a full, clear, and exact description, reference being had to the accompanying drawing, forming a part of this specification.

My invention relates to an indicating device particularly adapted for use on pneumatic tired vehicles for the purpose of automatically notifying the operator when the tire pressure falls below a predetermined degree.

The preferred form of my invention comprises an indicator located on the body of the vehicle, in view of the operator, and a controlling device carried by each wheel of the vehicle, the controlling device being operable in response to pressure derived from the tire.

Prior to this invention pressure indicating devices for pneumatic tires have been provided with an electric switch for controlling an indicator, and a diaphragm adapted to actuate the electric switch when the tire pressure rises to a predetermined degree. In this connection it is important to note that the prior diaphragms yield gradually as the pressure rises in the tire, and the pressure required to deflect the diaphragms is approximately equal to the pressure required to hold them in their deflected condition. If the signals controlled by these gradually yielding diaphragms show when the maximum pressure is obtained in filling the tire, it is apparent that such signals do not show when the tires should be " pumped up ". Or if said devices indicate the minimum pressure they do not show when the desired maximum is obtained.

One of the objects of my invention is to produce a simple diaphragm adapted to be deflected in response to the pressure of a fluid, and adapted to remain in its deflected position until the pressure drops to a predetermined degree. The diaphragm is so constructed that it may be deflected to open an electric switch when the pressure rises to a predetermined maximum degree, and it will hold the switch in its open position until the pressure drops to the minimum degree.

An advantage derived from a device of this kind is that the operator is notified of two different conditions. First, when the switch opens in response to the maximum degree of pressure (usually 80 pounds), and second, when the pressure drops to the predetermined minimum (usually 70 pounds).

Figure I is a side elevation of a portion of a motor vehicle equipped with my indicating device. Fig. II is an enlarged cross section showing the tire and the indicator controlling device. Fig. III is a detail view of a portion of the front axle and the central portion of a wheel, showing the rotatable conductor carried by the wheel and the brush engaging said conductor. Fig. IV is a section taken approximately on the line IV—IV, Fig. III. Fig. V is an enlarged cross section, taken through the diaphragm chamber. Fig. VI is a detail view of the diaphragm, drawn on a smaller scale than Fig. V.

In the accompanying drawings: 1 designates the hub of a motor vehicle wheel, and 2 the pneumatic tire casing fitted to said wheel, the usual pneumatic tube 3 being arranged in said casing. The pneumatic tube is provided with the usual filling nipple 4 extending through the felly of the wheel.

Briefly stated, the device I have shown consists of an electric switch secured to the nipple 4 and under the control of the pressure of the inner tube, an indicator in the form of a lamp 5, and conductors leading from the switch to the lamp.

The switch controlling devices include a diaphragm 6 in a housing 7, the latter being secured to the nipple 4 by means of a coupling 8. The diaphragm housing is formed with an extension 9 containing a check valve 10. A second check valve 11 is arranged in the nipple 4 below the diaphragm housing and the lower end of said housing is provided with a pin 12 adapted to engage and open the check valve 11. To inflate the tire the air under pressure is introduced through the extension 9 to the nipple 4 and into the inner tube 3. The check valve 11 is held open by the pin 12 when my attachment is secured to the nipple, the sole function of said check valve 11 being to prevent the escape of air when the attachment is removed from the wheel.

A switch housing 13 is secured to the upper end of the diaphragm housing. The switch inclosed by the housing 13 is composed of a yoke 14 and a rod 15 provided with a nut 16 adapted to engage said yoke. The circuit is opened and closed by moving the nut 16 into and out of engagement with the yoke 14. The rod 15 is slidably fitted to a spring seat 17 screwed into the diaphragm housing, and the lower end of said rod is formed with a head 18 engaging the diaphragm 6. 19 designates a spring interposed between the head 18 and the spring seat 17. The spring 19 forces the head of rod 15 against one side of the diaphragm and the air pressure of the inner tube is exerted on the opposite side of the diaphragm.

The spring seat 17 is adjustable to vary the degree of spring pressure above the diaphragm. To separate the nut 16 from the yoke 14 the spring pressure and the resistance offered by the diaphragm must be overcome by the air pressure of the inner tube. When the tube is inflated to the maximum degree the diaphragm is forced upwardly from the position shown in Fig. II and the nut 16 is then separated from the yoke 14. When the tube pressure falls below a predetermined degree, the diaphragm returns to the position shown in Fig. II, and the spring 19 forces the nut 16 into engagement with the yoke 14, thereby completing an electric circuit which will be presently described. An insulating collar 21, screwed onto the upper end of the rod 15, is slidably fitted to the yoke 14. To insure a firm contact in closing the switch, the yoke 14 is yieldingly supported by a spring 22 and movably fitted to a rod 23, the latter being insulated from the switch housing.

A wire 25 leading from the switch housing (Fig. II) is electrically connected to the yoke 14, through the medium of the rod 23. A wire 26 is connected directly to the switch housing and electrically connected to the nut 16 through the medium of the rod 15, spring seat 17 and the upper end of the diaphragm housing. It will be understood that the function of the automatic switch is to electrically connect the wires 25 and 26 by engaging the nut 16 with the yoke 14. The wire 25 is connected to a ring 27 fixed to the wheel so as to revolve therewith but insulated from the hub 1 as shown in Fig. III and Fig. IV. A fixed brush 28 engaging the ring 27 is connected to a wire 29 leading to the lamp 5. The wire 26 leading from the switch housing is connected to the wheel hub 1. This may be termed a ground connection inasmuch as the wheel hub is electrically connected to the axle and frame of the vehicle. A wire 26' (Fig. I) connects the frame of the vehicle to a battery 30 or some other source of electrical energy, and a wire 31 leads from the battery to the lamp 5. The circuit is normally open at the switch formed by the nut 16 and yoke 14, and this switch is closed automatically to light the lamp 5 when the air pressure on the diaphragm 6 falls below a predetermined degree.

The diaphragm 6 is preferably a laminated structure, consisting of a plurality of circular pieces of sheet metal fitted to each other and firmly secured at their margins to the diaphragm housing.

6' designates an annular bead formed by pressing the diaphragm near its marginal edge. It is important to note that the diaphragm is pressed or hammered to produce a normally bowed structure having a convex face which is exposed to the air pressure of the tire as shown by full lines in Figs. II and V. By forming the diaphragm in this manner I produce a switch operating device adapted to open the switch (14 and 16) when the tire pressure rises to a predetermined maximum degree, for example 80 pounds, thereby notifying the operator that the tire is under the desired maximum pressure; and this diaphragm will retain the switch in its open position until the pressure drops to the predetermined minimum degree, for example 70 pounds. To open the switch, the bowed diaphragm must be bent from its normal condition, shown by full lines in Figs. I and V, to the position shown by dotted lines in Fig. V; and owing to the shape of the diaphragm, considerable pressure, for example 80 pounds, is required to effect the initial deflection. However, when the initial resistance is overcome, the diaphragm moves freely and quickly to its deflected position. It is to be understood that, while a pressure of 80 pounds may be necessary to effect the initial deflection in opening the switch, the continued movement of the diaphragm may be effected by a lower pressure, for example, 70 pounds, and the diaphragm is maintained in its deflected position until the air pressure drops to 70 pounds. The normally bowed diaphragm is somewhat similar to the yieldable bottom of an ordinary oil can, both of which tend to remain in a bowed condition, firmly resisting the pressure applied to their convex faces. However, when the initial resistance is overcome, the normally bowed members move freely and quickly, and they may be prevented from returning by a comparatively low degree of pressure.

In the practical use of my pressure indicating device, the electric circuit including the signal lamp 5 may be energized when the tire pressure drops to 70 pounds, and the diaphragm is then positioned as seen in Fig. II to permit the switch contact 16 to engage the contact yoke 14. The operator is thus notified that the tire pressure should be increased, and the switch will remain in its closed position until the pressure on the convex face of the diaphragm is increased to (for example) 80 pounds. The switch then opens very quickly and remains in its open position until the tire pressure drops to 70 pounds. From the foregoing, it will be apparent that my switch operating device is adapted to notify the operator of two different conditions, the lamp 5 being energized when the tire pressure drops to the predetermined degree, and being extinguished when the tire pressure rises to the predetermined maximum degree.

When the diaphragm 6 is deflected to the position shown by dotted lines in Fig. V, it engages the inner ends of screws 30, the latter being screwed through the top wall of the diaphragm housing, and provided with jam nuts which engage said housing. The minimum pressure, i. e. the pressure required to retain the diaphragm in its deflected position, may be varied by adjusting the screws 30. If the screws are adjusted to permit the diaphragm to bend only a slight distance, the pressure required to hold the diaphragm in such a position will be greater than the pressure required to hold it after it has been deflected a greater distance. After the middle portion of the diaphragm has been deflected to a plane beyond the marginal portion, it may be held by a pressure considerably less than the pressure required to effect the deflection; but if the deflection is comparatively slight a greater degree of pressure will be required to retain the diaphragm in its deflected condition.

The pressure required to deflect the diaphragm may be varied by adjusting the spring seat 17 to vary the pressure of spring 19.

While I have herein shown and described the indicating device as applied to a pneumatic tired wheel, it is to be understood that the invention is not in any way limited to such use.

I claim:—

1. An operating device of the character described comprising a normally bowed metallic diaphragm having a convex face and adapted to spring quickly from one fixed position to another fixed position in response to pressure on said convex face, and a housing member to which said normally bowed metallic diaphragm is secured, said housing member being adapted to receive fluid under pressure, the normally bowed metallic diaphragm being so arranged that its convex face is exposed to the fluid pressure, and the bowed portion of said metallic diaphragm being so formed that the diaphragm will remain in a fixed normal condition until subjected to a predetermined high pressure and thereafter remain in a fixed deflected condition until the pressure drops a predetermined number of degrees.

2. An operating device of the character described comprising a normally bowed metallic diaphragm having a convex face and adapted to spring quickly from one fixed position to another fixed position in response to pressure on said convex face, a housing member to which said normally bowed metallic diaphragm is secured, said housing member being adapted to receive fluid under pressure, the normally bowed metallic diaphragm being so arranged that its convex face is exposed to the fluid pressure, and the bowed portion of said metallic diaphragm being so formed that the diaphragm will remain in a fixed normal condition until subjected to a predetermined high pressure and thereafter remain in a fixed deflected condition until the pressure drops a predetermined number of degrees, and an adjustable device for limiting the movements of said metallic diaphragm.

3. An operating device of the character described comprising a normally bowed metallic diaphragm having a convex face and adapted to spring quickly from one fixed position to another fixed position in response to pressure on said convex face, a housing member to which said normally bowed metallic diaphragm is secured, said housing member being adapted to receive fluid under pressure, the normally bowed metallic diaphragm being so arranged that its convex face is exposed to the fluid pressure, and the bowed portion of said metallic diaphragm being so formed that the diaphragm will remain in a fixed normal condition until subjected to a predetermined high pressure and thereafter remain in a fixed deflected condition until the pressure drops a predetermined number of degrees, and an abutment device for limiting the movements of the normally bowed portion of said metallic diaphragm, said abutment device including a screw adapted to be adjusted to vary the action of the bowed portion of said metallic diaphragm, thereby varying the difference between the two positions of said metallic diaphragm.

4. An operating device of the character described comprising a normally bowed metallic diaphragm including a plurality of metallic diaphragm members closely fitted together to form a laminated diaphragm structure having a convex face and adapted to spring quickly from one fixed position to another fixed position in response to pressure on said convex face, and a housing member to which said normally bowed metallic diaphragm is secured, said housing member being adapted to receive fluid under pressure, the normally bowed metallic diaphragm being so arranged that its convex face is exposed to the fluid pressure, and the bowed portion of said metallic diaphragm being so formed that the diaphragm will remain in a fixed normal condition until subjected to a predetermined high pressure and thereafter remain in a fixed deflected condition until the pressure drops a predetermined number of degrees.

5. An operating device of the character described comprising a normally bowed metallic diaphragm having a convex face and adapted to spring quickly from one fixed position to another fixed position in response to pressure on said convex face, an annular bead being formed around said convex face, and a housing member to which said normally bowed metallic diaphragm is secured, said housing member being adapted to receive fluid under pressure, the normally bowed metallic diaphragm being so arranged that its convex face is exposed to the fluid pressure, and the bowed portion of said metallic diaphragm being so formed that the diaphragm will remain in a fixed normal condition until subjected to a predetermined high pressure and thereafter remain in a fixed deflected condition until the pressure drops a predetermined number of degrees.

6. A switch operating device comprising a housing member, a metallic diaphragm secured to said housing member, said metallic diaphragm being normally bowed to such an extent that it will remain in its normal condition until subjected to a predetermined high pressure and thereafter remain in a fixed deflected condition until the pressure drops a predetermined number of degrees, the normally bowed portion of said diaphragm being so formed that it will spring quickly from one position to another and return quickly when the pressure drops a predetermined number of degrees, and means for transmitting movement from said diaphragm so that the switch element controlled thereby may partake of the rapid movements of the diaphragm, said housing member being adapted to receive fluid under pressure and said normally bowed diaphragm being so arranged that its normally convex face is exposed to the fluid pressure.

JOHN L. PARDUE.

In presence of:—
E. K. CLARK,
A. J. McCAULEY.